United States Patent [19]

Amneus, III

[11] Patent Number: 5,174,524
[45] Date of Patent: Dec. 29, 1992

[54] COOLING SYSTEM FOR HIGH SPEED AIRCRAFT

[75] Inventor: John S. Amneus, III, Cincinnati, Ohio

[73] Assignee: General Electric Company, Cincinnati, Ohio

[21] Appl. No.: 774,497

[22] Filed: Oct. 10, 1991

[51] Int. Cl.⁵ .................. B64D 33/02; F02C 7/04
[52] U.S. Cl. ..................... 244/53 B; 244/117 A; 244/158 A; 137/15.1
[58] Field of Search ............ 244/53 R, 53 B, 117 A, 244/158 A, 163; 239/127.1, 265.15; 137/15.1, 15.2; 60/234, 270.1, 245, 251

[56] References Cited

U.S. PATENT DOCUMENTS

| | | | |
|---|---|---|---|
| 2,727,706 | 12/1955 | Heilig | 239/265.15 |
| 3,074,668 | 1/1963 | Frenzl | |
| 3,138,009 | 6/1964 | McCreight | 244/117 A |
| 3,167,909 | 2/1965 | Theilman | 239/265.15 |
| 3,313,488 | 4/1967 | Lovingham | 239/265.15 |
| 3,321,154 | 5/1967 | Downs | 244/117 A |
| 3,369,782 | 2/1968 | Billig et al. | 244/117 A |
| 3,449,189 | 6/1969 | Hatch | 239/265.15 |
| 3,690,102 | 9/1972 | DuPont | |
| 4,745,740 | 5/1988 | Dunn et al. | |
| 4,821,512 | 4/1989 | Guile et al. | |

Primary Examiner—Galen Barefoot
Attorney, Agent, or Firm—Jerome C. Squillaro

[57] ABSTRACT

An inlet ramp for an aircraft engine is constructed as a movable panel which is internally cooled by fluid coolant. At a selected time, the coolant flow is terminated allowing the panel to overheat and melt away so as to expose an underlayer of ablative material. The ablative material then begins to melt away thereby cooling the underlying surface of the aircraft via ablation.

12 Claims, 3 Drawing Sheets

COOLING SYSTEM FOR HIGH SPEED AIRCRAFT

BACKGROUND OF THE INVENTION

1. Field of the Invention

The present invention relates in general to the combination of ablative cooling with convective cooling and relates in particular to cooling an inlet ramp for a scramjet engine using such combined cooling methods.

2. Description of Prior Developments

During the development of high speed or hypersonic aircraft, it is general practice to conduct actual in-flight testing of engines and propulsion systems in order to better measure and understand the performance of the propulsion system. In the case of missiles or aircraft powered by ramjet or scramjet engines, it is very difficult or impossible to achieve realistic test conditions during ground tests. For this reason, it is beneficial to boost the vehicle to a predetermined test altitude and hypersonic test velocity using a rocket. At this point, the rocket is turned off and the test engine is turned on for in-flight testing. Once testing is completed, the vehicle is returned to earth for evaluation.

During the ascent, testing and descent phases of flight, the inlet ramp to the scramjet engine is subjected to varying heat loads generated by high speed airflow. A typical scramjet engine inlet includes multiple ramped surfaces which are aligned at progressively steeper angles relative to the incoming airflow. As the incoming air impinges on these ramps, it is compressed by passing through successive shock waves.

This compression increases both the static pressure and temperature of the air adjacent the scramjet inlet. When this heated pressurized air is flowing at a very high speed, it transfers a large amount of heat to the inlet ramps. The amount of heat transferred to the inlet ramps increases as the air temperature and air pressure increase.

For the high speed air flows encountered during the various phases of in-flight scramjet tests, the scramjet engine inlet ramps must be cooled in order to prevent them from overheating and burning or melting away. Radiation cooling, film cooling, transpiration cooling, convection cooling and heat-sink cooling, among others, are all possible methods which may be applied to cool the inlet ramps. However, because of the significantly varying heat loads experienced during the different phases of in-flight testing, one cooling method alone does not appear capable of practically or efficiently handling the overall cooling task.

As a ramjet or scramjet flight test vehicle is boosted by rocket to its test altitude and velocity, it is desirable to close off the inlet to the engine. The inlet is preferably closed in order to reduce the total heat load on the engine by preventing hot high-speed air from entering the internal engine flowpath during boost.

Such inlet closing is carried out, for example, by pivoting outwardly one or more of the inlet ramp surfaces so as to block off the scramjet air inlet. Unfortunately, by so moving the inlet ramp surface, the incidence angle of the air on the pivoted or actuated ramp surface increases and thereby increases the local heat load on these pivoted surfaces.

Once a desired altitude and velocity has been achieved, the rocket booster is deactivated and the test phase of the flight begins. The inlet to the scramjet engine is then opened to allow air into the engine for combustion. This opening may be carried out by moving the ramp surfaces to a position where the entire inlet ramp defines a smooth flat ramped surface for guiding air into the inlet.

It is most important during operation of the scramjet that these ramp surfaces maintain a well controlled geometry in order to provide smooth airflow into the scramjet engine. In the event these surfaces are warped, melted or burned from overheating, either during the ascent or test phases of flight, airflow into the engine can be disrupted and engine performance can be adversely affected. Thus, it is important that the ramp cooling system maintain a smooth ramp surface during both ascent and test. Convection, film, transpiration, heat sink and radiation cooling systems all can maintain this smooth surface. Ablative cooling schemes generally cannot.

It is preferable to have clean airflow into the engine during operation with as little turbulence as possible. The cooling of the inlet ramp during scramjet operation should also avoid the introduction of foreign substances or contaminants into the inlet. The scramjet operation could be adversely affected by the injection and passage of coolant gases or particles through the engine.

Film, transpiration, and ablative cooling systems all introduce foreign matter into the flow system, so they are not desirable for use during the test phase of flight. Radiation and heat sink cooling do not appear capable of handling the high heat loads on the inlet ramp. Convection cooling appears to be most suitable for this application.

After a period of in-flight testing, the scramjet is deactivated or turned off to allow the test vehicle to decelerate and descend to ground level. During descent, in order to reduce the total heat load on the engine, it is important to prevent hot high-speed air from entering the scramjet through the engine inlet. This may be accomplished by the same procedure mentioned above, i.e. by moving a portion of the inlet ramp across the front of the inlet.

Again, the ramp must be cooled as it is heated by high velocity air during descent. Without cooling, the ramp which contacts the high-speed air will burn or melt away, thereby making evaluation of the flight test more difficult or impossible.

Although convective cooling could be used to cool the ramp during the boost and test phases, it is not well suited for cooling the ramp during the descent phase. The main reason is that convection cooling during the descent phase would require the use of a large quantity of coolant due to the high heat load and long heat exposure period prior to reaching ground level.

In fact, the heat loads experienced by the inlet ramp during descent are greater than those experienced during the boost and test phases of the flight. Since convective cooling in aircraft often uses liquid fuel as the coolant, excessive fuel would be required to handle the heat loads during descent. This is clearly not a weight efficient solution to the inlet ramp cooling problem during descent. For the same reason, film and transpiration cooling are not suitable for cooling during the descent phase.

Accordingly, a need exists for a method and apparatus for cooling an inlet ramp to a scramjet engine while it is being boosted to operational speed and altitude with a rocket.

A further need exists for a method and apparatus for cooling an inlet ramp to a scramjet engine as the scramjet is operational, such as during flight tests, while avoiding the introduction of coolant or contaminants into the inlet of the scramjet.

Another need exists for efficiently cooling the inlet ramp of a scramjet engine of a test vehicle as it descends to ground level.

SUMMARY OF THE INVENTION

The present invention has been developed to fulfill the needs noted above, and therefore has as an object the provision of an efficient cooling system for the inlet ramp of a scramjet or ramjet engine.

Another object of the invention is the provision of such a system which avoids the introduction of coolant contaminants into the inlet of a scramjet or ramjet engine during engine operation.

Still another object of the invention is the provision of a cooling system for a scramjet or ramjet engine wherein ambient air is prevented from entering the engine during boost and descent phases of flight and wherein ambient air is allowed into the engine during engine operation.

Yet another object of the invention is to provide a smooth inlet ramp for a scramjet or ramjet engine so as to promote smooth airflow into the engine.

Briefly, the invention is directed to a dual mode cooling system for an inlet ramp of a scramjet engine. The system includes a movable panel which forms a portion of the inlet ramp to the engine. The panel is provided with internal passages through which flows coolant, such as liquid fuel, for convectively cooling the panel during boost and engine operation phases.

After the scramjet engine is deactivated such as after the completion of an engine test, the panel is again positioned over the inlet of the engine to prevent hot air from entering and damaging the engine during descent. At this time, coolant does not flow through the panel. As the panel is impacted by the high speed airflow during descent, the panel overheats and melts away and exposes an underlayer of sacrificial ablative material.

The ablative material also melts, chars or sublimates, but at a controlled or predetermined rate so as to protect its underlying structure from being overheated during descent. Because ablative cooling is used during descent, no coolant is required as would be the case if convective cooling were used.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In The Drawings

In the various figures of the drawing, like reference characters designate like parts.

DESCRIPTION OF THE PREFERRED EMBODIMENTS

Figure 1:
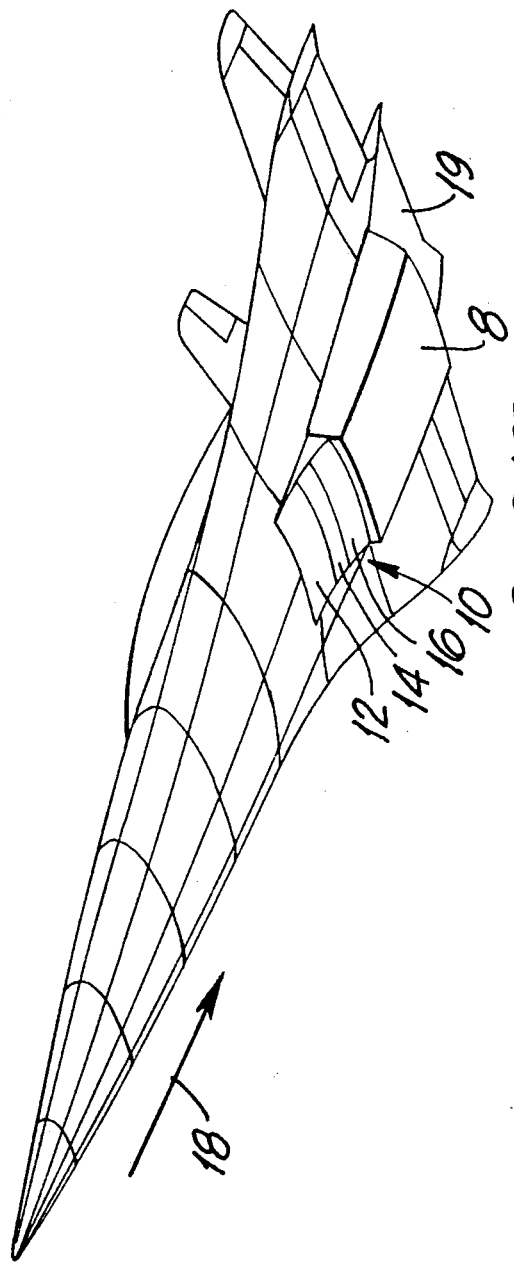
FIG. 1 is a schematic perspective view of a scramjet engine on a hypersonic vehicle.
Figure 2:
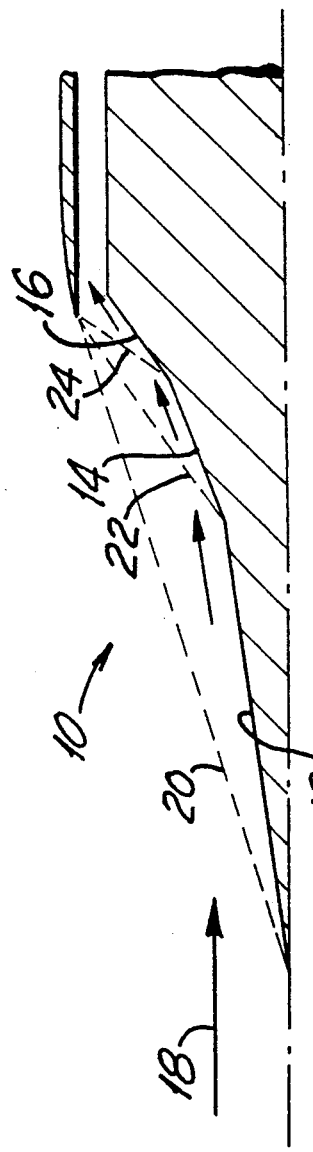
FIG. 2 is a schematic fragmental sectional view of an inlet ramp structure for a scramjet, according to the prior art.

In order to better appreciate the advantages of the present invention, it may be of value to briefly review a prior art inlet ramp design for a ramjet or scramjet engine 8 as shown in FIGS. 1 and 2. A typical ramjet or scramjet engine inlet 10 includes multiple ramp surfaces or ramp portions 12,14,16 which are aligned at progressively steeper angles relative to the incoming airflow 18. Airflow 18 enters the inlet 10, is combusted in engine 8 and exhausted through exhaust nozzle 19.

As the incoming air impinges on these ramps, it is compressed by passing through successive shock waves 20,22,24. This compression increases both the static pressure and temperature of the air. For high speed airflows, the ramp surfaces 12, 14 and 16 must be cooled.

Figure 3:
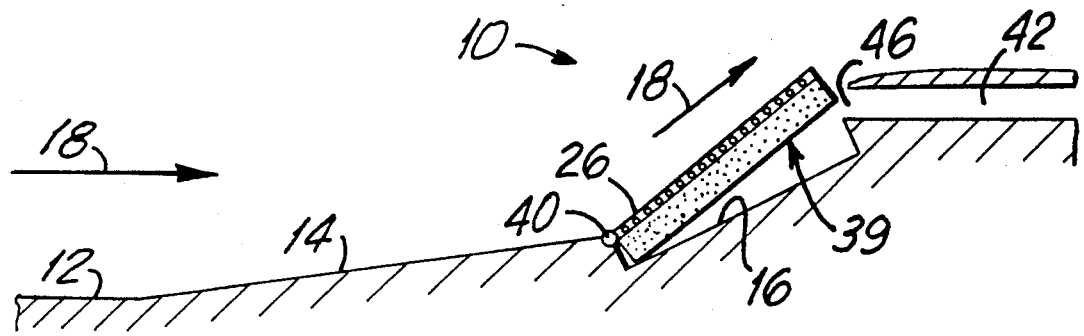
FIG. 3 is a schematic fragmental sectional view of an inlet ramp structure according to the present invention, showing a ramp portion pivoted outwardly to block airflow to a combustor.
Figure 4:
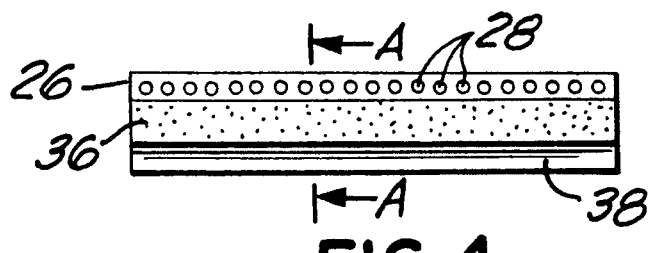
FIG. 4 is an enlarged side view of the ramp portion of FIG. 3.
Figure 5:
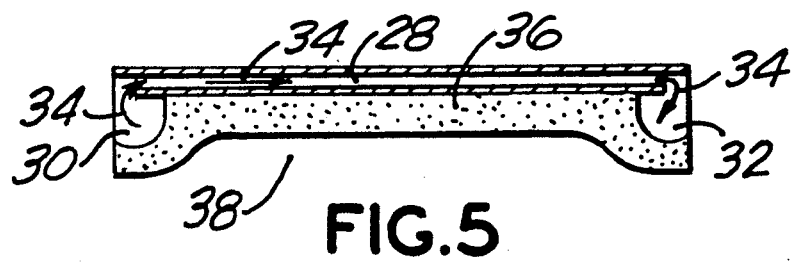
FIG. 5 is a sectional view taken through line A—A of FIG. 4.

As seen in FIG. 3, the present invention provides cooling to the inlet 10 by covering one or more of the ramp portions 12,14,16 with an internally cooled panel 26. Panel 26, as better seen in FIGS. 4 and 5, is formed with a plurality of internal coolant passages 28 through which a fluid coolant is pumped, such as liquid fuel. In this manner, panel 26, which may be formed of a heat conducting metallic material, may be convectively cooled in an efficient manner.

Coolant manifolds 30,32 may be provided for respectively distributing and collecting the coolant 34 as shown in FIG. 5. Coolant flow may be controlled using conventional techniques.

A layer 36 of ablative material is laminated or mounted to the underside of panel 26 for providing ablative cooling during a descent phase of flight. Layer 36 may be formed of any suitable high temperature ablative material such as silicone foam, silica phenolics, polytetrafluoroethylene, carbon/carbon composite material and the like. A wide recess or channel 38 may be contoured into the undersurface of layer 36 to form an insulating air space between the ablative material and the underlying ramp surface 16 (FIG. 5).

Panel 26 and ablative layer 36 together form a pivotable ramp portion 39 as shown in FIG. 3. Ramp portion 39 is shown pivotally hinged to ramp portion 14 at hinge joint 40. Any conventional drive mechanism may be employed to pivot ramp portion 39 about hinge joint 40 in a selectively controlled or programmed fashion.

Ramp portion 39, as seen in FIG. 3, is pivoted outwardly from underlying ramp portion 16 so as to block off airflow 18 to combustor 42 during initial take-off or boost. As the aircraft to which the engine inlet 10 is attached is boosted to its test altitude and velocity, coolant 34 is pumped through coolant passages 28 to convectively cool panel 26 and prevent heat damage to the underlying aircraft or missile structure. By blocking off airflow to the combustor, the engine is protected from exposure to hot flowing air and overheating damage.

Figure 6:
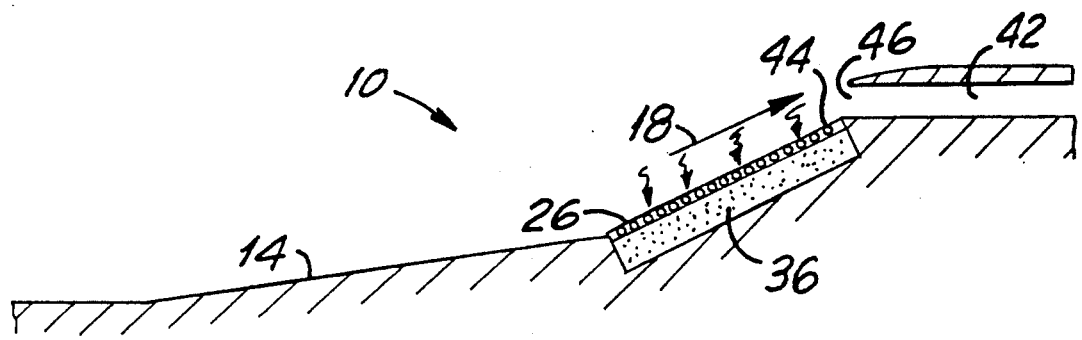
FIG. 6 is a view similar to FIG. 3 showing the ramp portion pivoted inwardly.

Once test altitude and velocity have been reached, the rocket booster is deactivated and ramp portion 39 is pivoted inwardly as shown in FIG. 6 so as to provide a smooth outer surface 44 over which incoming airflow smoothly passes just prior to entering the inlet 46 of combustor 42. Ramp portion 39 is maintained in its FIG. 6 retracted position as the scramjet engine is initially activated as well as throughout in-flight operation of the engine. During this test phase of flight, coolant 34 is continuously pumped through coolant passages 28 so as to convectively cool ramp portion 39 and the underlying structure.

Figure 7:
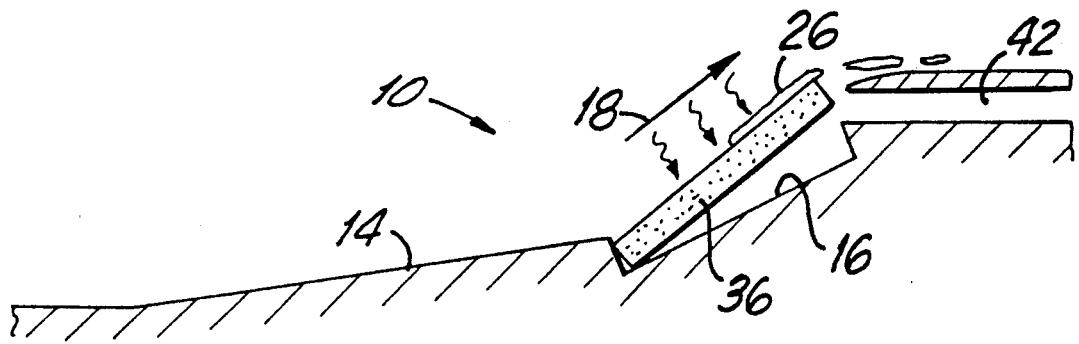
FIG. 7 is a view similar to FIG. 3, showing ablation of the outer panel material.

After the in-flight operation or testing of the scramjet engine is completed, the engine is turned off and the ramp portion 39 is again pivoted outwardly as shown in FIG. 7. At this time, coolant flow through panel 26 is halted or terminated as the aircraft begins its descent back to ground. Inlet 46 is blocked off by ramp portion 39 to prevent hot air from entering and damaging the scramjet engine.

Because coolant flow has been terminated, panel 26 rapidly overheats and melts during descent and is carried away by airflow 18. As the panel 26 melts away, the underlying ablative layer 36 is exposed to the high speed airflow 18. As ablative layer 36 is heated by the high speed air, it too melts, chars or sublimates away at a controlled rate, and in so doing provides ablative cooling to the underlying structure adjacent ramp portion 16.

No fluid coolant is required for this descent phase of the flight. Thus, this design provides a smooth, well-contoured flowpath surface for the test phase of the flight without requiring large amounts of coolant for the descent phase as would be required with convective cooling only.

Figure 8:
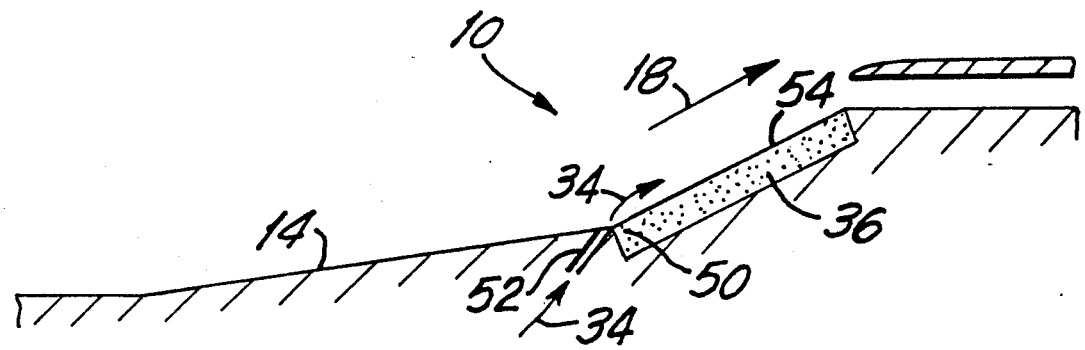
FIG. 8 is a view similar to FIG. 3 showing an alternate embodiment of the invention wherein the ramp portion is actively cooled by film injection.

Although convective cooling is an effective form of active cooling for the boost and test phases of scramjet test flight, any type or form of fluid-cooled panel could be used. In fact, the active cooling system need not include a panel at all. Film or transpiration cooling could be used to protect the underlying ablative material while maintaining a smooth flowpath as shown in FIG. 8.

Coolant 34 may be injected at the leading edge 50 of ablative layer 36 through coolant injection channels 52. In this manner, the coolant forms an insulating boundary layer over the outer surface 54 of ablative layer 36 and thereby prevents premature heating of the ablative material. When the smooth flowpath is no longer required, the coolant is simply turned off, and the ablative material is left to protect the underlying structure by ablative cooling.

This design is not limited to use in engine inlets. It may be of use in engine nozzles or combustors, or in airframes. More broadly, this design may be useful for applications other than hypersonic vehicles. It may be useful in any high-temperature system where a smooth flowpath is desired for one portion of the operating cycle, but minimum coolant use is desired for another portion.

Moreover, the cooled ramp need not be pivoted or movable as described above. Inlets may be closed by other means, or may not be closed at all. In the case of a missile, the ramp could be convectively cooled, but fixed in position. This would allow a portion of the engine to overheat or burn up during descent.

There has been disclosed heretofore the best embodiment of the invention presently contemplated. However, it is to be understood that various changes and modifications may be made thereto without departing from the spirit of the invention.

What is claimed is:

1. A cooling system for high speed aircraft, comprising:
    first cooling mean provided on said aircraft for cooling a surface portion of said aircraft; and
    ablative cooling means provided on said aircraft adjacent said first cooling means, said ablative cooling means being drivably movable with respect to said aircraft such that upon deactivation of said first cooling means and upon controlled driven movement of said ablative cooling means, said ablative cooling means undergoes ablation.

2. The system of claim 1, wherein said first cooling means comprises convective cooling.

3. The system of claim 1, wherein said surface portion of said aircraft comprises an inlet ramp to an aircraft engine.

4. The system of claim 3, wherein said aircraft engine comprises a scramjet.

5. The system of claim 4, wherein said inlet ramp comprises a pivotable inlet ramp.

6. The system of claim 1, wherein said first cooling means comprises a convectively cooled panel and wherein said ablative cooling means comprises a layer of ablative material mounted to said panel.

7. A method of cooling a surface portion of an inlet ramp for an aircraft engine of a high speed aircraft, wherein said method comprises cooling said surface portion with convection cooling means; deactivating said convection cooling means; and cooling said surface portion with ablative cooling.

8. The method of claim 7, further comprising melting said convection cooling means after deactivating said convection cooling means.

9. The method of claim 7, wherein said surface portion is a movable surface portion and wherein said method further comprises moving said surface portion prior to deactivating said convection cooling means so as to increase the heat load applied to said surface portion.

10. An inlet ramp for controlling airflow into a high speed aircraft engine, comprising:
    a ramp member controllably movable with respect to said engine, said ramp member comprising a smooth outer surface portion for selectively introducing said airflow into said engine and for selectively blocking said airflow from entering said engine, said ramp member comprising an ablative material for providing ablative cooling to said inlet ramp; and
    fluid cooling means for directing a fluid coolant about said ramp member prior to ablation of said ablative material.

11. The ramp of claim 10, wherein said fluid cooling means comprises a panel mounted over said ablative material.

12. The ramp of claim 11, wherein said panel comprises coolant passage means formed therein.

* * * * *